United States Patent [19]
Farrell

[11] Patent Number: 5,135,701
[45] Date of Patent: Aug. 4, 1992

[54] HIGH-SPEED INJECTION MOLDING APPARATUS AND METHOD

[75] Inventor: John J. Farrell, Green Brook, N.J.

[73] Assignee: BM, Inc., Somerville, N.J.

[21] Appl. No.: 699,192

[22] Filed: May 13, 1991

[51] Int. Cl.⁵ .................................................. B29C 45/53
[52] U.S. Cl. ........................... 264/328.1; 264/328.4; 425/558; 425/559; 425/561; 425/562; 425/586
[58] Field of Search ............... 425/561, 562, 563, 557, 425/558, 559, 544, 583, 586; 264/328.1, 328.4, 328.5

[56] References Cited

U.S. PATENT DOCUMENTS

| | | |
|---|---|---|
| Re. 28,721 | 2/1976 | Farrell . |
| 3,335,461 | 8/1967 | Schwartz . |
| 3,807,921 | 4/1974 | Murgatroyd ........................ 425/562 |
| 3,940,223 | 2/1976 | Farrell . |
| 4,070,142 | 1/1978 | Farrell . |
| 4,073,944 | 2/1978 | Dawson ............................... 425/562 |
| 4,073,944 | 2/1978 | Dawson . |
| 4,099,904 | 7/1978 | Dawson ............................... 425/562 |
| 4,154,287 | 5/1979 | Kharagezov et al. . |
| 4,224,716 | 9/1980 | Wagner ............................... 425/562 |
| 4,290,701 | 9/1981 | Schad . |
| 4,389,358 | 6/1983 | Hendry . |
| 4,390,332 | 6/1983 | Hendry . |
| 4,498,860 | 2/1985 | Gahan . |
| 4,632,652 | 12/1986 | Farrell . |
| 4,722,679 | 2/1988 | Farrell . |
| 4,749,536 | 6/1988 | Farrell . |
| 5,011,399 | 4/1991 | Farrell . |

FOREIGN PATENT DOCUMENTS 3600566 2/1987 Fed. Rep. of Germany .

Primary Examiner—Jill L. Heitbrink
Attorney, Agent, or Firm—Ralph W. Selitto, Jr.

[57] ABSTRACT

Apparatus and method for injecting a shot of flowable material into a mold involve moving a plunger-type injector in a continuous non-decelerating manner past an outlet which leads to the mold. The injector is decelerated, but only after it passes the outlet to the mold.

27 Claims, 3 Drawing Sheets

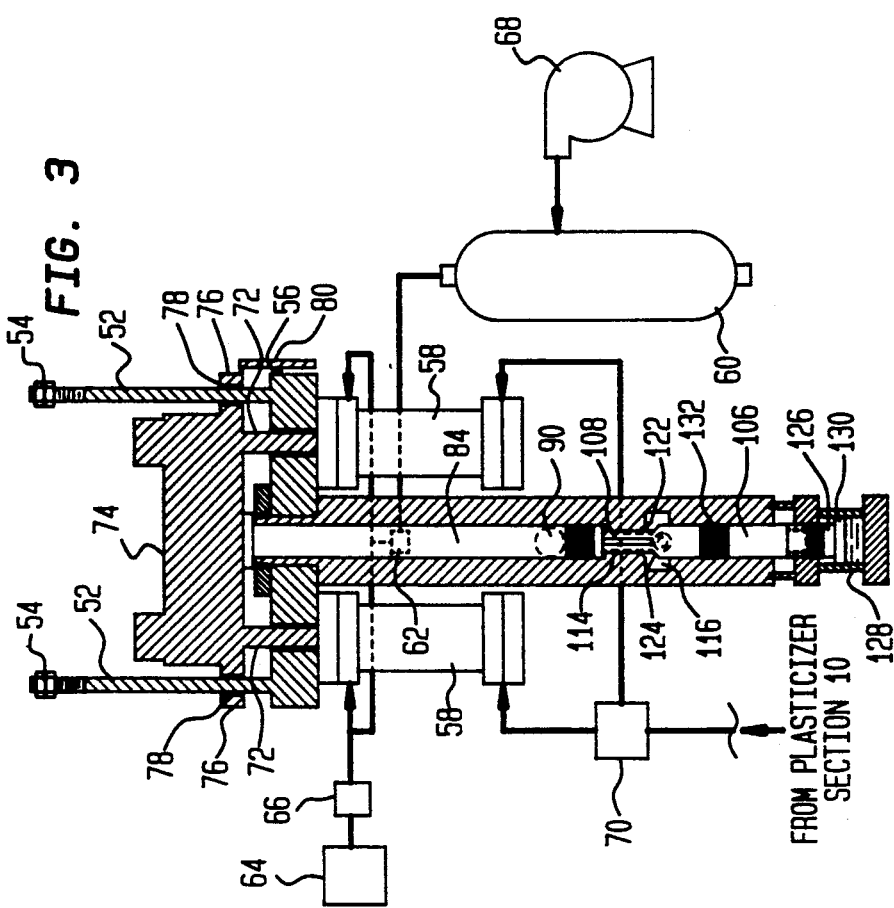
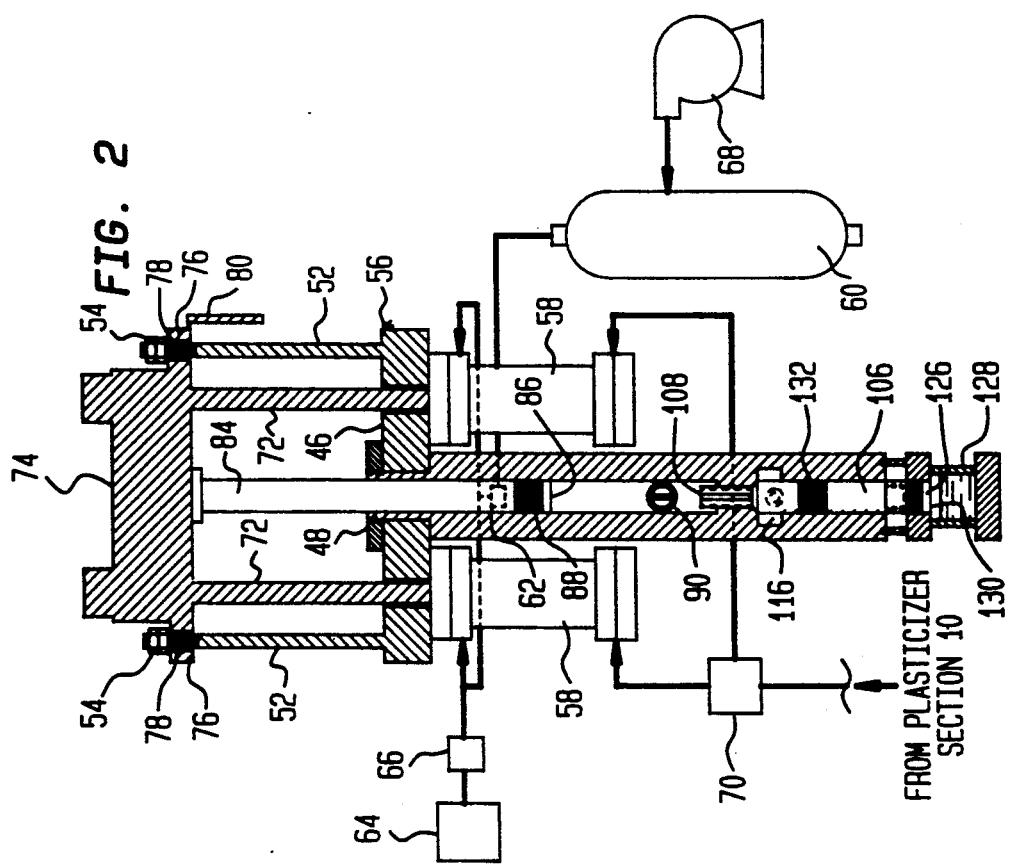

HIGH-SPEED INJECTION MOLDING APPARATUS AND METHOD

FIELD OF THE INVENTION

The present invention relates to injection molding or injection blow molding machines, and, more particularly, to apparatus and methods for injecting material to be molded into the molds of such machines.

BACKGROUND OF THE INVENTION

In order to reduce the molding cycle of injection molding machines, such machines have been provided with a valve adapted to cut off communication between a mold and a plasticizer (i.e., extruder) as soon as the plasticizer has completed injecting plastic material into the mold, whereby the plasticizer can start to accumulate plastic material for another shot as the plastic material in the mold cools (see, for instance, my U.S. Pat. No. Re. 28,721). An auxiliary piston and cylinder arrangement performs a packing operation by maintaining pressure on the plastic material in the mold and supplying additional plastic material to the mold in order to compensate for shrinkage during the cooling cycle. At the conclusion of the cooling cycle, the auxiliary piston and cylinder arrangement also performs a suck back operation by which plastic material contained in a runner is severed from the plastic material in the mold.

In order to further reduce the molding cycle of injection molding machines, such machines have utilized two plasticizers which function alternately (see, for instance, my U.S. Pat. Nos. 3,940,223 and 4,070,142). The two plasticizers operate in synchronization such that one is prepared for the next injection operation, while the other one is injecting plastic material into the mold. More particularly, as soon as either plasticizer has injected plastic material into the mold, a valve shuts off that plasticizer from communication with the mold. A piston and cylinder arrangement is then employed to perform the packing and the suck back operations described above. Thus, the piston and cylinder arrangement performs two operations which would normally be performed by the plasticizers. However, because the plasticizers still perform a mold filling function, the molding machines which utilize such plasticizers still suffer from two disadvantages which are common to screw type plasticizers: namely, relatively low injection pressures and slow fill rates.

The injection molding apparatus disclosed in my U.S. Pat. Nos. 4,722,679 and 4,749,536 increase the injection pressures and fill rates of the machines described above by using the screw type plasticizers of such machines to supply plastic material to a receiving means, such as an interior chamber of a cylinder, while both the plasticizer and the receiving means are shut off from communication with a mold by, for instance, closing a control valve situated in a passage extending between the mold and the plasticizer. After establishing communication between the mold and the receiving means, the plastic material contained in the receiving means is injected into the mold by an injecting means, such as a reciprocating plunger associated with the cylinder. Although the apparatus disclosed in U.S. Pat. Nos. 4,722,679 and 4,749,536 represent improvements over my earlier machines described above, the shot capacities and fill rates of my improved apparatus are still not optimal in view of the ever increasing demands placed on today's injection molding and injection blow molding machines.

SUMMARY OF THE INVENTION

The present invention represents a further improvement over the molding machines described hereinabove. More particularly, an injection apparatus for injecting a shot of plastic or other flowable material into a mold includes a barrel having a bore extending between opposed ends of the barrel. The barrel also has an inlet and an outlet which are positioned on opposite sides of the barrel intermediate the ends thereof. A plunger is mounted for reciprocating movement within the bore of the barrel between a retracted position, in which a feed end of the plunger is located in one end of the barrel, and an extended position, in which the feed end of the plunger is located in the opposite end of the barrel. As a result of this construction, the feed end of the plunger must move past the outlet of the barrel as the plunger is moved from its retracted position to its extended position.

In accordance with the present invention, the plunger is moved in a continuous, non-decelerating manner from its retracted position to a cut-off position located intermediate the retracted and extended positions of the plunger. The cut-off position is reached when the feed end of the plunger has moved to a point just beyond the outlet of the barrel, thereby obstructing the outlet and preventing any additional plastic from flowing therethrough. As the plunger continues to move from its cut-off position to its extended position, the plunger is decelerated.

In one embodiment, the plunger is moved from its retracted position to its extended position by a first hydraulic cylinder assembly. A second hydraulic cylinder assembly functions in the manner of a shock absorber to decelerate the plunger as it moves from its cut-off position to its extended position.

BRIEF DESCRIPTION OF THE DRAWINGS

For a better understanding of the present invention, reference is made to the following detailed description of an injection molding machine constructed in accordance with one exemplary embodiment of the invention and considered in conjunction with the accompanying drawings, in which:

FIG. 2 is a cross-sectional view, taken along section line 2—2 in FIG. 1 and looking in the direction of the arrows, of the high-speed injection ram section of the machine illustrated in FIG. 1;

FIG. 3 is a cross-sectional view, similar to that of FIG. 2, showing the high-speed injection ram section when its plunger is in its fully extended position at the conclusion of an injection operation;

DESCRIPTION OF THE EXEMPLARY EMBODIMENT

Figure 1:
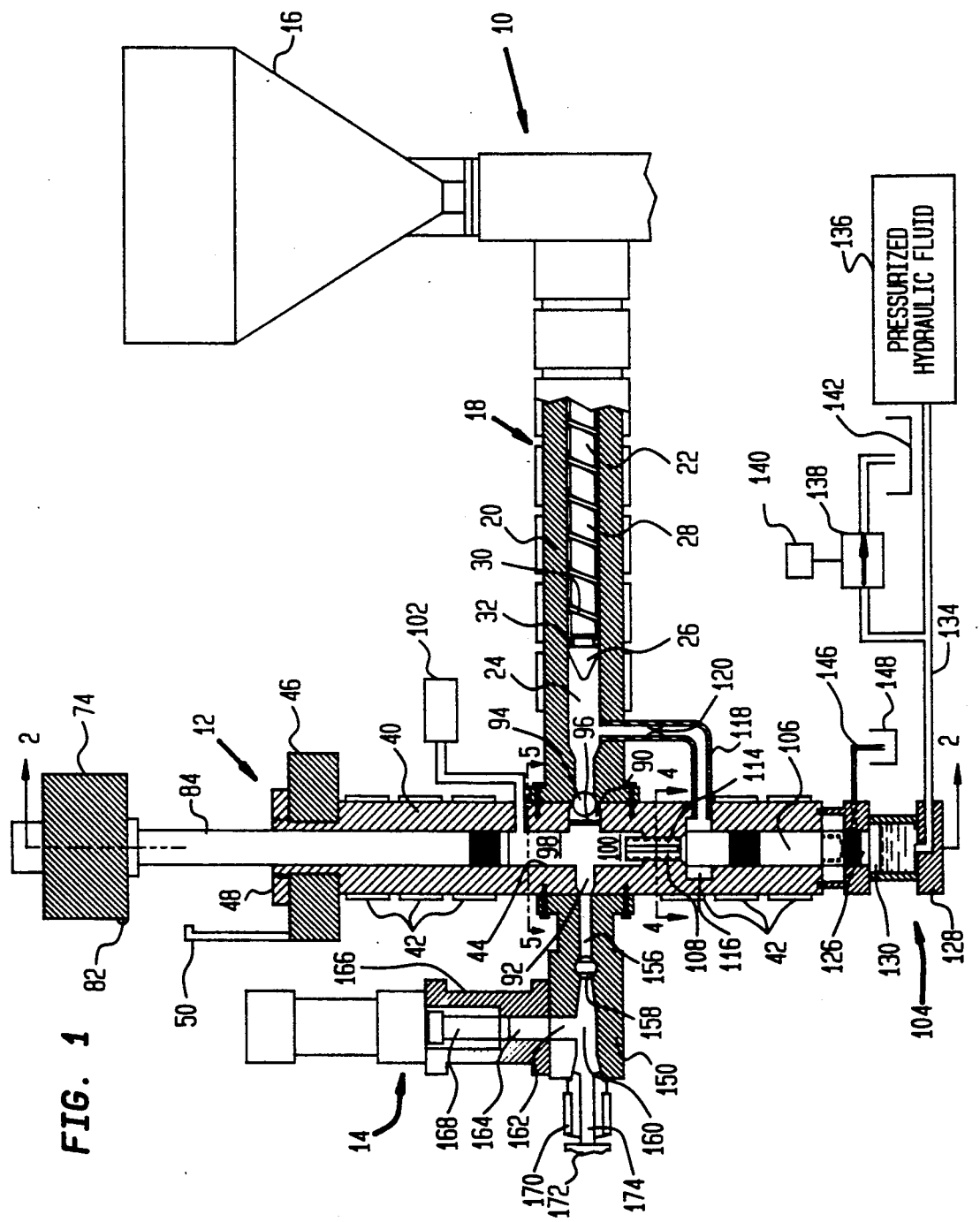
FIG. 1 is a cross-sectional view of an injection molding machine of the reciprocating screw type which is constructed in accordance with one exemplary embodiment of the present invention and which includes a high-speed injection ram section equipped with a plunger shown in its fully retracted position prior to the performance of an injection or mold filling operation.
Figure 4:
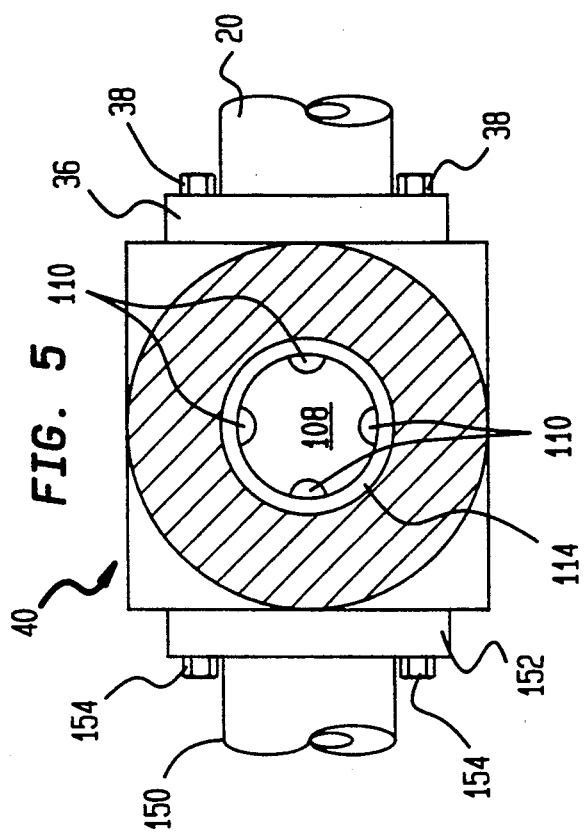
FIG. 4 is a cross-sectional view, taken along section line 4—4 in FIG. 1 and looking in the direction of the arrows, of the high-speed injection ram section of the machine illustrated in FIG. 1.

With reference to FIG. 1, there is shown an injection molding or injection blow molding apparatus. The apparatus consists of a plasticizer section 10, a high-speed injection ram section 12 and a time-saver section 14. Each of these sections will be described individually below.

The Plasticizer Section

Figure 5:
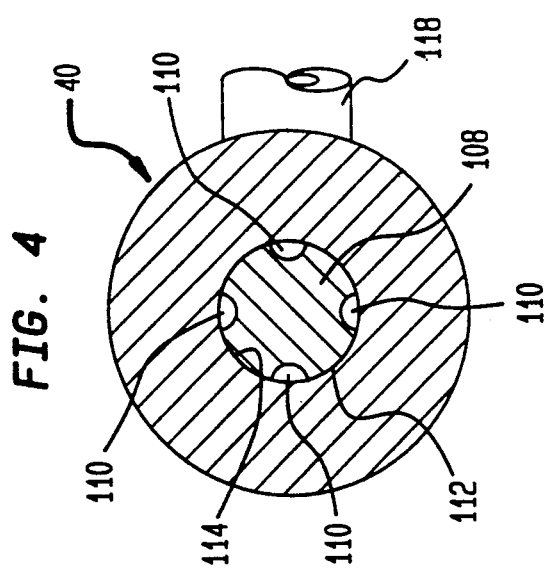
FIG. 5 is a cross-sectional view, taken along section line 5—5 in FIG. 1 and looking in the direction of the arrows, of the high-speed injection ram section of the machine illustrated in FIG. 1.

Referring now to FIGS. 1 and 5, the plasticizer section 10 includes a hopper 16, which is filled with plastic material, and a horizontally arranged, reciprocating screw type plasticizer or extruder 18, which receives plastic material from the hopper 16. The extruder 18 includes a barrel 20 and a plasticizer screw 22, which is rotatably mounted in an interior chamber 24 of the barrel 20. Any suitable rotational drive mechanism, such as the one disclosed in U.S. Pat. No. Re. 28,721, may be employed to rotate the screw 22. The screw 22 is also mounted for reciprocating (i.e., longitudinal) movement within the barrel 20, such reciprocating movement being achieved by any suitable reciprocating drive mechanism, such as the one disclosed in U.S. Patent No. Re. 28,721. The screw 22 includes a head 26 and a body 28 having a helical flight 30. A check ring 32 is disposed about the screw 22 between the head 26 and the body 28 thereof for a purpose to be described hereinafter. Band heaters 34 are disposed about the barrel 20 in order to maintain plastic material contained in the chamber 24 at an elevated temperature. One end of the barrel 20 is fitted with a flange 36 (see FIG. 5) tapped for bolts 38 (see also FIG. 5).

The High-Speed Injection Ram Section

Referring now to FIGS. 1-5, the high-speed injection ram section 12 includes a barrel 40 having a cylindrical exterior surface which is flattened or rectangular where the flange 36 contacts the barrel 40 (see FIG. 5). Band heaters 42 are disposed about the barrel 40 along substantially the entire length thereof for the purpose of maintain contained in a bore 44 of the barrel 40 at an e A cylinder support frame 46 is locked in place on an upper end of the barrel 40 by a lock nut 48. A limit switch actuator 50 (see FIG. 1) extends upwardly from the cylinder support frame 46 for a purpose to be described hereinafter.

With particular reference to FIGS. 2 and 3, stop rods 52 extend upwardly from opposite sides of the cylinder support frame 46. The free end of each of the stop rods 52 is externally threaded so as to threadedly receive a pair of adjustable nuts 54 whose function will be described below. A limit switch 56 is mounted on one side of the cylinder support frame 46 for a purpose which will also be described below.

Ram cylinders 58 extend downwardly from opposite sides of the cylinder support frame 46. While both of the ram cylinders 58 are of a hydraulic type, they could also be of a pneumatic type. Each of the ram cylinders 58 has a piston (not shown) mounted for reciprocating movement therein. The rod end of each of the ram cylinders 58 is connected to an accumulator 60 by a "T" connection having a directional valve 62 which, when energized, allows hydraulic fluid to flow from the accumulator 60 to the rod ends of the ram cylinders 58. An adjustable back-pressure valve 64, which performs a function to be described below, communicates with the "T" connection through a directional valve 66, which controls the flow of hydraulic fluid out of the back-pressure valve 64. The accumulator 60 is charged by a pump 68 which, in turn, is energized by its own power source (not shown), such as a motor. The accumulator 60, which functions to charge high volumes of hydraulic fluid at high pressures for subsequent use during a later point in the operating cycle, can be of the bladder-type, such as those manufactured by the Nacol, Greer, Parker or Vickers companies. A directional valve 70, which receives hydraulic fluid from the pump system of the plasticizer section 10, is connected to the piston end of each of the ram cylinders 58 for a purpose to be described hereinafter.

Piston rods 72 extend upwardly from the pistons (not shown) of the ram cylinders 58 to a ram beam 74 which is positioned above the cylinder support frame 46 Because the ram beam 74 conjointly with the piston rods 72 and hence the pistons (not shown) of the ram cylinders 58, the ram beam 74 is adapted for reciprocating movement relative to the ram cylinders 58, the cylinder support frame 46 and hence the barrel 40. More particularly, the ram beam 74 is adapted for reciprocating movement between a fully retracted position illustrated in FIG. 2 and a fully extended position illustrated in FIG. 3.

The ram beam 74 has ears 76 which extend outwardly from opposite sides of the ram beam 74. Each of the ears 76 has a bore 78 sized and shaped so as to permit the free and unobstructed passage of a corresponding one of the stop rods 52, but not the adjustable nuts 54 carried thereon. A limit switch actuator 80 extends downwardly from one of the ears 76 of the ram beam 74 for a purpose to be described hereinafter. The ram beam 74 is also provided with a limit switch 82 (see FIG. 1) whose function will also be described hereinafter.

A plunger 84 also depends from the ram beam 74. The plunger 84 has a feed end 86 which extends into the bore 44 of the barrel 40 and which reciprocates within the barrel 40 in response to the reciprocating movement of the ram beam 74. Thus, the plunger 84 is adapted for reciprocating movement relative to the barrel 40 between a fully retracted position illustrated in FIG. 2 and a fully extended position illustrated in FIG. 3. Seal rings 88 are disposed about the plunger 84 near the feed end 86 so as to prevent plastic in the bore 44 of the barrel 40 from flowing beyond the feed end 86 of the plunger 84 during an injection operation to be described below.

Referring again to FIG. 1, the barrel 40 has an inlet 90 on one side and an outlet 92 on an opposite side. The inlet 90 and the outlet 92 communicate with the bore 44 of the barrel 40 intermediate the upper and lower ends of the barrel 40.

The inlet 90 is provided with a check valve consisting of a ball 94 and a retainer pin 96. The check valve functions to permit plastic to flow from the plasticizer section 10 to the high-speed injection ram section 12, but prevents plastic flow in the reverse direction (i.e., from the high-speed injection ram section 12 to the plasticizer section 10) during an injection operation to be described below.

The inlet 90 and the outlet 92 divide the bore 44 of the barrel 40 into an upper shot chamber 98 and a lower deceleration chamber 100. That is, the portion of the bore 44 below the inlet 90 and the outlet 92 defines the deceleration chamber 100, while the remainder of the bore 44 constitutes the shot chamber 98.

An adjustable transducer 102 is in communication with the shot chamber 98. The transducer 102 is adapted to sense the pressure within the shot chamber 98 for a purpose which will be described hereinafter.

Referring now to FIGS. 1-5, the lower end of the barrel 40 is provided with a deceleration assembly 104 which includes a valve rod 106 mounted for reciprocating movement in the lower end of the bore 44 of the barrel 40. The upper end of the valve rod 106 has a splined portion 108 which includes a plurality of channels 110 (see FIGS. 4 and 5) in an outer circumferential surface 112 of the splined portion 108 (see FIGS. 4 and 5). The outer circumferential surface 112 of the splined portion 108 is in sliding engagement with a reduced diameter portion 114 of the barrel 40.

The bore 44 of the barrel 40 has an annular reservoir 116 just below the reduced diameter portion 114 of the barrel 40. A return line 118 (see FIG. 1) connects the reservoir 116 to the interior chamber 24 of the barrel 20 of the extruder 18 for a purpose which will be described hereinafter. The return line 118 includes an adjustable flow control valve 120, such as a needle valve, adapted to perform a function which will also be described hereinafter.

An annular valve seat 122 (see FIG. 3) is formed by a bevelled surface provided where the reservoir 116 meets the reduced diameter portion 114 of the barrel 40. The valve seat 122 cooperates with a bevelled shoulder 124 on the valve rod 106 to perform a sealing function which will be described in greater detail below.

The lower end of the valve rod 106 is threadedly attached to a piston rod 126 which extends upwardly from a hydraulic cylinder 128. The hydraulic cylinder 128 includes a piston 130 which is mounted for reciprocating movement within the hydraulic cylinder 128 and which is attached to the piston rod 126 such that the piston rod 126 and hence the valve rod 106 move conjointly with the piston 130 as it reciprocates within the hydraulic cylinder 128.

Seal rings 132 are disposed about the valve rod 106 intermediate its upper and lower ends. The seal rings 132 function to prevent plastic in the bore 44 of the barrel 40 from escaping out the lower end of the barrel 40.

The piston end of the hydraulic cylinder 128 is connected by a line 134 to a source 136 of pressurized hydraulic fluid (see FIG. 1). The line 134 also communicates with a high/low pressure relief valve 138 which is piloted to a directional valve 140 adapted, when energized, to prevent the relief valve 138 from exhausting to a tank 142, thereby maintaining high pressure in the hydraulic cylinder 128. The rod end of the hydraulic cylinder 128 is connected by a line 146 to a tank 148. The line 146 and the tank 148 cooperate to prevent a vacuum from forming inside the hydraulic cylinder 128 and to allow the accumulation of hydraulic fluid which has inadvertently leaked past the piston 130 of the hydraulic cylinder 128.

The Time-Saver Section

The time-saver section 14 includes a housing 150 which is provided with a flange 152 (see FIG. 5) adapted for attachment to the flattened or rectangular portion of the barrel 40 by bolts 154 (see also FIG. 5). The housing 150 has a passage 156 which is in communication with the outlet 92 of the shot chamber 98 and which is provided with a rotary shut-off valve 158 adapted to control the flow of plastic from the outlet 92 through the passage 156. Cartridge heaters (not shown) are provided in the housing 150 in order to maintain the plastic at an elevated temperature.

The passage 156 also communicates with an enlarged passage 160 which, in turn, communicates with another passage 162. The passage 162 is in communication with an interior chamber 164 of a cylinder 166. A plunger 168 is mounted for reciprocating movement within the chamber 164 of the cylinder 166.

A melt manifold 170 extends from the housing 150 to a mold 172. The manifold 170 includes a restricted passage 174 which may be considered as part of the runner of the mold 172.

The Operation of the Apparatus

At start-up, the shut-off valve 158 is closed and the plunger 168 of the time-saver section 14 is in its retracted position. The plunger 84 of the high-speed injection ram section 12 is in a neutral position (i.e., a position in which the feed end 86 of the plunger 84 is above the inlet 90 and the outlet 92 of the shot chamber 98). When the plunger 84 is in its neutral position, the limit switch actuator 50 has engaged the limit switch 82 thereby enabling the screw 22 of the extruder 18 of the plasticizer section 10 and energizing the back-pressure valve 64. If the limit switch 82 is not engaged by the limit switch actuator 50 (meaning that inlet 90 of the shot chamber 98 could be blocked by the plunger 84), then the screw 22 of the extruder 18 is disabled as a safety measure.

Assuming that the plunger 84 is in its neutral position, the screw 22 of the extruder 18 is extended to feed plastic through the chamber 24 of the plasticizer section 10 and into the inlet 90 of the high-speed injection ram section 12. The flow of plastic into the inlet 90 forces the ball 94 against the retainer pin 96, thereby allowing the plastic to enter the bore 44 of the barrel 40 and to flow into the shot chamber 98 and the deceleration chamber 100.

As the pressure in the shot chamber 98 increases due the increasing amount of plastic supplied thereto, the plunger 84 is moved upwardly from its neutral position to its fully retracted position (see FIG. 2) under resistance established by the back-pressure valve 64 which controls the back pressure on the pistons (not shown) of the ram cylinders 58. The plunger 84 continues to move until the nuts 54 on the stop rods 52 are engaged by the ears 76 of the ram beam 74. Because the nuts 54 are adjustable, the retracted position of the plunger 84 can be varied to thereby vary the capacity of the shot chamber 98.

The screw 22 of the extruder 18 continues to rotate and supply plastic to the shot chamber 98 until a predetermined pressure is reached within the shot chamber 98. When the transducer 102 senses that the predetermined pressure has been reached, the rotation of the screw 22 is terminated and the screw 2 is retracted to its neutral position (i.e., a position in which the return line 118 is not obstructed by the screw 22 and in which there is enough room in the chamber 24 to receive plastic delivered thereto through the return line 118).

The shut-off valve 158 is now opened and, after a slight time delay to insure the proper opening of the shut-off valve 158, the ram cylinders 58 are actuated to thereby move the plunger 84 downwardly from its fully retracted position in a continuous, non-decelerating manner. Such movement of the plunger 84 causes the feed end 86 to inject the plastic contained in the shot chamber 98 through the outlet 92 of the high-speed injection ram section 12 and into the mold 172 and the time saver section 14. During this injection or mold-filling operation, the ball 94 prevents the plastic from reentering the plasticizer section 10. Also, high pressure is maintained within the hydraulic cylinder 128 of the deceleration assembly 104 for the purpose of counteracting the forces exerted on the valve rod 106 as the plunger 84 is extended and thereby maintaining the shoulder 124 of the valve rod 106 in sealing engagement with the valve seat 122 of the barrel 40.

The plunger 84 is moved in a continuous, non-decelerating manner until it reaches a cut-off position (i.e., a position intermediate its fully retracted position illustrated in FIG. 2 and its fully extended position illustrated in FIG. 3) in which the feed end 86 is just beyond the outlet 92, thereby blocking the outlet 92 and hence preventing the flow of plastic therethrough. When the plunger 84 reaches its cut-off position, the limit switch 56 is simultaneously engaged by the limit switch actuator 80. Once energized, the limit switch 56 functions to simultaneously de-energize the directional valve 62 for the purpose of cutting off the supply of hydraulic fluid to the rod ends of the ram cylinders 58. As a result, after the plunger 84 reaches its cut-off position, it is no longer being moved in a continuous, non-decelerating manner by the ram cylinders 58. The plunger 84 has, however, built up substantial momentum due,, to its considerable velocity; and, therefore, it continues to move downward in the bore 44 of the barrel 44 after reaching its cut-off position.

The engagement of the limit switch 56 by the limit switch actuator 80 also simultaneously closes the shut-off valve 158 and initiates the operation of the time-saver section 14 which performs the packing and suck back operations described in U.S. Pat. Nos. 4,722,679 and 4,749,536. The energization of the limit switch 56 also causes the simultaneous de-energization of the directional valve 140 associated with the high/low pressure relief valve 138, thereby reducing the pressure within the hydraulic cylinder 128 of the deceleration assembly 104. Although reduced, the pressure within the hydraulic cylinder 128 is still capable of generating a counteracting force on the feed end 86 of the plunger 84 sufficient to cause the plunger 84 to decelerate at a higher than normal rate as its moves along the deceleration chamber 100. The directional valve 70 is also energized simultaneously with the energization of the limit switch 56 to deliver pressurized hydraulic fluid from the pump system of the plasticizer section 10 to the piston end of the ram cylinders 58 and thereby assist in the deceleration of the plunger 84 as it moves along the deceleration chamber 100.

When the force exerted on the valve rod 106 by the descending plunger 84 exceeds the counteracting force generated by, among other things, the hydraulic cylinder 128, the valve rod 106 is depressed far enough to unseat the shoulder 124 of the valve rod 106 from the valve seat 122 (see FIG. 3) and thereby permit plastic to flow from the deceleration chamber 100, through the channels 110 of the splined portion 108 and into the reservoir 116. From the reservoir 116, the plastic flows through the return line 118 and into the interior chamber 24 of the extruder 18 of the plasticizer section 10. The resistance to flow provided by the flow control valve 120, which is located in the return line 118, further assists in the deceleration of the plunger 84.

Even if the complete deceleration of the plunger 82 has not been achieved before it reaches the valve rod 106 and/or the bottom of the deceleration chamber 100 (a point at which the plunger 84 is in its fully extended position), the plunger 84 will be slowed to such an extent that its impact with the valve rod 106 and/or the bottom of the deceleration chamber 100 (i.e., the upper end of the reduced diameter portion 114 of the barrel 40) would not have a detrimental effect. If it is desired to prevent the plunger 84 from impacting against the valve rod 106 and/or the bottom of the deceleration chamber 100, the pressure in the hydraulic cylinder 128 can be regulated by remotely controlling the directional valve 140 associated with the high/low pressure relief valve 138 in an effort to avoid such impact.

Once the plunger 84 has been completely decelerated, the directional valve 66 would be de-energized in order to open up the back-pressure valve 64 to tank. Also, the directional valve 70 would be energized in order to supply hydraulic fluid to the piston ends of the ram cylinders 58 for the purpose of returning the plunger 84 to its neutral position. As noted above, the ram cylinders 58 would otherwise be disabled until the limit switch 82 is engaged by the limit switch actuator 50, at which time the directional valve 70 is de-energized in order to terminate the flow of hydraulic fluid to the piston ends of the ram cylinders 58 in preparation for the commencement of another injection or mold-filling operation by the high-speed injection ram section 10. It should also be noted that the limit switch 82 is maintained in a non-operational state as the plunger 84 moves from its fully retracted position to its fully extended position to thereby avoid energizing the limit switch 82 during such movement of the plunger 84.

One advantage of the apparatus illustrated in FIGS. 1-5 is that it has the capability of maintaining high-speed through the entire injection stroke of the plunger 84 due to the fact that the plunger 84 does not decelerate at any time before the plastic is injected into the mold 172. The ability to fill the mold 172 at high speed is advantageous because it inhibits the formation of a temperature gradient in the plastic contained in the mold 172 and therefore inhibits the formation of stresses which would otherwise form in the plastic due to the existence of such a temperature gradient. High speed injection also reduces the cycle time and increases the production rate of the apparatus. In addition, the use of the accumulator 60 to power the ram cylinders 58 allows for quick recovery time in preparation for the next injection or mold-filling operation, thereby further reducing the cycle time and further increasing the production rate of the apparatus.

Another advantage of the apparatus illustrated in FIGS. 1-5 is that the amount of plastic injected into the mold 172 can be controlled with a high degree of accuracy. That is, because the volume of the shot chamber 98 is determined by mechanical means (by the fixed but adjustable location of the feed end 86 of the plunger 84 as determined by the positioning of the nuts 54 on the stop rods 52 and by the fixed location of the outlet 92 of the shot chamber 98) a more exact amount of plastic can be injected into the mold 172.

The modular construction of the apparatus illustrated in FIGS. 1-5 is also advantageous because it permits the high-speed injection ram section 12 to be retrofitted on existing injection molding machines. Thus, if the normal shot capacity of an existing injection molding machine is too small for a particular job, or if the injection stroke of such a machine is too slow, the machine can be retrofitted with the high-speed injection ram section 12 to thereby increase the capacity of the shot and the speed of the machine, without having to replace the entire machine, or, at a minimum, its plasticizer screw.

Notwithstanding the advantages of the apparatus illustrated in FIGS. 1-5, it will be understood that the apparatus is merely an exemplary embodiment of the present invention and that a person skilled in the art may make many variations and modifications in such apparatus without departing from the spirit and scope of the invention. For instance, the apparatus could be adapted to work with material other than plastic. All such variations and modifications are intended to be included within the scope of the invention as defined in the appended claims.

I claim:

1. A method for injecting a shot of flowable material into a mold, comprising the steps of supplying the flowable material to a receiving means having an outlet leading to the mold; moving an injecting means in a continuous non-decelerating manner within said receiving means unit said injecting means has moved past said outlet of said receiving means such that a predetermined amount of the flowable material is injected into the mold; and decelerating said injecting means after said injecting means has moved past said outlet of said receiving means.

2. Apparatus for injecting a shot of flowable material into a mold, comprising a barrel having a bore extending from one end of said barrel to an opposite end of said barrel, said bore having an inlet positioned on one side of said barrel intermediate said one end thereof and said opposite end thereof and an outlet positioned on an opposite side of said barrel intermediate said one end thereof and said opposite end thereof; injecting means for injecting a shot of flowable material contained in said bore of said barrel into a mold through said outlet of said bore, said injecting means including a plunger having a feed end; mounting means for mounting said injecting means in said bore of said barrel such that said injecting means is movable in a reciprocating fashion between a retracted position, in which said feed end of said plunger is located on one side of said outlet, and an extended position, in which said feed end of said plunger is located on an opposite side of said outlet, whereby said feed end o said p moves past said outlet of said bore as said injecting means is moved from said retracted position to said extended position; moving means for moving said injecting means in a continuous non-decelerating manner from said retracted position to a cut-off position, which is intermediate said retracted and extended positions and in which said feed end of said plunger is located on said opposite side of said outlet of said bore, and for moving said injecting means from said cut-off position to said extended position; and decelerating means, located in said opposite end of said barrel, for decelerating said injecting means as said injecting means moves from said cut-off position to said extended position.

3. Apparatus according to claim 2, wherein said decelerating means includes a shock-absorbing cylinder having a piston mounted for reciprocating movement therein, said piston being urged toward a rod end of said cylinder by pressure within said cylinder.

4. Apparatus according to claim 3, wherein the portion of said bore of said barrel delimited by said cut-off position of said injecting means and by said extended position of said injecting means forms a deceleration chamber, and wherein said decelerating means further includes a valve rod connected to said piston of said shock-absorbing cylinder and extending into said deceleration chamber from said opposite end of said barrel.

5. Apparatus according to claim 4, wherein said decelerating means further includes connecting means for connecting said deceleration chamber to a source of flowable material which is in communication with said inlet of said bore and controlling means for controlling the flow of flowable material from said deceleration chamber to said connecting means in response to the pressure exerted on said valve rod by said injecting means as said injecting means moves from said retracted position to said extended position.

6. Apparatus according to claim 5, wherein said decelerating means further includes restricting means in said connecting means for restricting flow through said connecting means.

7. Apparatus according to claim 5, wherein said controlling means includes sealing means for sealing off said connecting means from said deceleration chamber until a predetermined pressure is reached in said deceleration chamber.

8. Apparatus according to claim 7, wherein said sealing means includes a bevelled annular shoulder on said valve rod and a bevelled annular seat formed in said bore of said barrel, said shoulder being urged into sealing engagement with said seat by said piston of said shock-absorbing cylinder until said predetermined pressure is reached in said deceleration chamber, said predetermined pressure being greater than the pressure within said cylinder to thereby move said shoulder out of its sealing engagement with said seat.

9. Apparatus according to claim 8, wherein said decelerating means further includes regulating means for regulating the pressure within said cylinder between a first pressure setting which is maintained while said injecting means moves from said retracted position to said cut-off position, said first pressure setting being greater than said predetermined pressure to thereby maintain said shoulder in its sealing engagement with said seat, and a second pressure setting which is maintained while said injecting means moves from said cut-off position to said extended position, said second pressure setting being less than said predetermined pressure to thereby allow said shoulder to move out of its sealing engagement with said seat.

10. Apparatus according to claim 2, wherein said moving means includes at least one ram cylinder having a piston mounted for reciprocating movement therein and attaching means, including a piston rod, for attaching said piston to said plunger such that said plunger reciprocates conjointly with said piston.

11. Apparatus according to claim 8, wherein said at least one ram cylinder includes first controlling means for controlling the flow of fluid to a piston end of said at least one ram cylinder such that fluid is supplied to said piston end while said injecting means moves from said cut-off position to said extended position, whereby said controlling means assists said decelerating means to decelerate said injecting means.

12. Apparatus according to claim 11, wherein said at least one ram cylinder further includes second controlling means for controlling the flow of fluid to a rod end of said at least one ram cylinder such that he flow of fluid to said rod end is automatically terminated when said injecting means reaches said cut-off position.

13. Apparatus according to claim 10, wherein said attaching means includes limiting means for limiting the movement of said piston rod of said at least one ram cylinder as said injecting means is returned to said retracted position.

14. Apparatus according to claim 13, wherein the portion of said bore of said barrel delimited by said retracted position of said injecting means and by said cut-off position of said injecting means forms a shot chamber, and wherein said limiting means is adjustable to thereby vary said retracted position of said injecting means and hence the volume of said shot chamber.

15. In an injection molding machine with an extruder having an interior chamber and a screw mounted for rotation within said interior chamber of said extruder such that said screw, upon its rotation, conveys flowable material through said interior chamber of said extruder; a flow path extending between said interior chamber of said extruder and a mold; first controlling means arranged in said flow path between said extruder and said mold for controlling the flow of flowable material through said flow path, said first controlling means being movable between a closed position in which said first controlling means prevents flowable material from flowing through said flow path and an open position in which said first controlling means permits flowable material to flow through said flow path; receiving means in communication with said flow path at a point between said extruder and said first controlling means for receiving flowable material which is conveyed through said flow path from said extruder when said first controlling means is in its closed position; injecting means for injecting the flowable material received in said receiving means into said mold when said first controlling means is in its open position; and maintaining means in communication with said flow path at a point between said mold and said first controlling means for maintaining pressure on the flowable material which is contained in said mold when said first controlling means is in its closed position, whereby said extruder can supply flowable material to said receiving means while said maintaining means continues to maintain the flowable material in the mold under pressure, the improvement wherein said receiving means includes a barrel having a bore extending from one end of said barrel to an opposite end of said barrel, said bore having an inlet in communication with said interior chamber of said extruder and positioned on one side of said barrel intermediate said one end thereof and said opposite end thereof and an outlet in communication with said maintaining means and positioned on an opposite side of said barrel intermediate said one end thereof and said opposite end thereof; and wherein said injecting means includes a plunger having a feed end, mounting means for mounting said plunger in said bore of said barrel such that said plunger is movable in a reciprocating fashion between a retracted position, in which said feed end of said plunger is located on one side of said outlet, and an extended position, in which said feed end of said plunger is located on an opposite side of said outlet, whereby said feed end of said plunger moves past said outlet of said bore as said plunger is moved from said retracted position to said extended position, moving means for moving said plunger in a continuous non-decelerating manner from said retracted position to a cut-off position, which is intermediate said retracted and extended positions and in which said feed end of said plunger is located on said opposite side of said outlet of said bore, and for moving said plunger from said cut-off position to said extended position, and decelerating means, located in said opposite end of said barrel, for decelerating said plunger as said plunger moves from said cut-off position to said extended position.

16. The improved injection molding machine of claim 15, wherein said decelerating means includes a shock-absorbing cylinder having a piston mounted for reciprocating movement therein, said piston being urged toward a rod end of said cylinder by pressure within said cylinder.

17. The improved injection molding machine of claim 16, wherein the portion of said bore of said barrel delimited by said cut-off position of said plunger and by said extended position of said plunger forms a deceleration chamber, and wherein said decelerating means further includes a valve rod connected to said piston of said shock-absorbing cylinder and extending into said deceleration chamber from said opposite end of said barrel.

18. The improved injection molding machine of claim 15, wherein said decelerating means further includes connecting means for connecting said deceleration chamber to a source of flowable material which is in communication with said inlet of said bore and controlling means for controlling the flow of flowable material from said deceleration chamber to said connecting means in response to the pressure exerted on said valve rod by said plunger as said plunger moves from said retracted position to said extended position.

19. The improved injection molding machine of claim 16, wherein said decelerating means further includes restricting means in said connecting means for restricting flow through said connecting means.

20. The improved injection molding machine of claim 18, wherein said controlling means includes sealing means for sealing off said connecting means from said deceleration chamber until a predetermined pressure is reached in said deceleration chamber.

21. The improved injection molding machine of claim 20, wherein said sealing means includes a bevelled annular shoulder on said valve rod and a bevelled annular seat formed in said bore of said barrel, said shoulder being urged into sealing engagement with said seat by said piston of said shock-absorbing cylinder until said predetermined pressure is reached in said deceleration chamber, said predetermined pressure being greater than the pressure within said cylinder to thereby move said shoulder out of its sealing engagement with said seat.

22. The improved injection molding machine of claim 21, said decelerating means further includes regulating means for regulating the pressure within said cylinder between a first pressure setting which is maintained while said plunger moves from said retracted position to said cut-off position, said first pressure setting being greater than said predetermined pressure to thereby maintain said shoulder in its sealing engagement with said seat, and a second pressure setting which is maintained while said plunger moves from said cut-off position to said extended position, said second pressure setting being less than said predetermined pressure to thereby allow said shoulder to move out of its sealing engagement with said seat.

23. The improved injection molding machine of claim 15, wherein said moving means includes at least one ram cylinder having a piston mounted for reciprocating movement therein and attaching means, including a piston rod, for attaching said piston to said plunger such that said plunger reciprocates conjointly with said piston.

24. The improved injection molding machine of claim 23, wherein said at least one ram cylinder includes second controlling means for controlling the flow of fluid to a piston end of said at least one ram cylinder such that fluid is supplied to said piston end while said plunger moves from said cut-off position to said extended position, whereby said second controlling means assists said decelerating means to decelerate said plunger.

25. The improved injection molding machine of claim 24, wherein said at least one ram cylinder further includes third controlling means for controlling the flow of fluid to a rod end of said at least one ram cylinder such that the flow of fluid to said rod end is automatically terminated when said plunger reaches said cut-off position.

26. The improved injection molding machine of claim 23, wherein said attaching means includes limiting means for limiting the movement of said piston rod of said at least one ram cylinder as said plunger is returned to said retracted position.

27. The improved injection molding machine of claim 26, the portion of said bore of said barrel delimited by said retracted position of said plunger and by said cut-off position of said plunger forms a shot chamber, and wherein said limiting means is adjustable to thereby vary said retracted position of said plunger and hence the volume of said shot chamber.

* * * * *

UNITED STATES PATENT AND TRADEMARK OFFICE
CERTIFICATE OF CORRECTION

PATENT NO. : 5,135,701
DATED : August 4, 1992
INVENTOR(S) : John J. Farrell

It is certified that error appears in the above-identified patent and that said Letters Patent is hereby corrected as shown below:

```
Column 3, line 45, delete "maintain" and insert
--maintaining plastic--.

lines 45-46 delete "e" and insert
--elevated temperature--.
```

Signed and Sealed this

Twelfth Day of July, 1994

Attest:

BRUCE LEHMAN

Attesting Officer     Commissioner of Patents and Trademarks